(12) United States Patent
Yeom

(10) Patent No.: US 12,530,509 B2
(45) Date of Patent: Jan. 20, 2026

(54) APPARATUS, METHOD AND SYSTEM FOR AUTOMATICALLY FORMING PIPE

(71) Applicant: K.C.ENC CO., LTD., Seoul (KR)

(72) Inventor: Kwan Koo Yeom, Chungcheongbuk-do (KR)

(73) Assignee: K.C.ENC CO., LTD., Seoul (KR)

( * ) Notice: Subject to any disclaimer, the term of this patent is extended or adjusted under 35 U.S.C. 154(b) by 1058 days.

(21) Appl. No.: 17/623,873

(22) PCT Filed: Jul. 1, 2020

(86) PCT No.: PCT/KR2020/008610
§ 371 (c)(1),
(2) Date: Dec. 29, 2021

(87) PCT Pub. No.: WO2021/002682
PCT Pub. Date: Jan. 7, 2021

(65) Prior Publication Data
US 2022/0366100 A1    Nov. 17, 2022

(30) Foreign Application Priority Data
Jul. 1, 2019 (KR) .................. 10-2019-0078958

(51) Int. Cl.
*G06F 30/20* (2020.01)
*G06F 113/14* (2020.01)

(52) U.S. Cl.
CPC .......... *G06F 30/20* (2020.01); *G06F 2113/14* (2020.01)

(58) Field of Classification Search
CPC ...................... G06F 30/20; G06F 2113/14

USPC ............................................................. 703/1
See application file for complete search history.

(56) References Cited

U.S. PATENT DOCUMENTS

| 4,779,436 A | * | 10/1988 | Schwarze | .......... | B23K 26/0838 |
| | | | | | 72/149 |
| 5,517,428 A | * | 5/1996 | Williams | .............. | G06F 30/18 |
| | | | | | 700/83 |
| 6,192,728 B1 | * | 2/2001 | Hu | ................. | B21D 7/024 |
| | | | | | 72/149 |

(Continued)

FOREIGN PATENT DOCUMENTS

| CN | 109359351 | 2/2019 |
| JP | 2001191119 | 7/2001 |

(Continued)

OTHER PUBLICATIONS

"Office Action of China Counterpart Application", with English translation thereof, issued on Oct. 18, 2024, pp. 1-12.

(Continued)

*Primary Examiner* — Iftekhar A Khan
(74) *Attorney, Agent, or Firm* — JCIPRNET

(57) ABSTRACT

Provided is a method of automatically forming a pipe, the method including inputting a design file to a program for automatically extracting information for forming a pipe, automatically extracting, from the design file, information about a cutting point for dividing a pipe included in the design file into a plurality of pipes and information about a bending point of each of the plurality of pipes, and transmitting, to a forming device for forming the pipe, pipe forming information including the cutting point and the bending point.

5 Claims, 6 Drawing Sheets

(56) References Cited

U.S. PATENT DOCUMENTS

| | | | | |
|---|---|---|---|---|
| 6,318,424 B1* | 11/2001 | Elfrink | B21D 9/08 144/195.1 |
| 7,007,534 B1* | 3/2006 | Myklebust | B29C 66/522 72/149 |
| 7,152,449 B2* | 12/2006 | Durney | E04C 2/08 72/379.2 |
| 9,175,798 B1* | 11/2015 | Thompson | F16L 55/1658 |
| 2002/0104361 A1* | 8/2002 | Broggi | B21D 7/024 72/306 |
| 2005/0034796 A1* | 2/2005 | Tanida | C22C 38/44 148/605 |
| 2006/0243018 A1* | 11/2006 | Krauss | B21D 41/02 72/370.1 |
| 2008/0228454 A1* | 9/2008 | Laudrain | G06F 30/00 703/7 |
| 2010/0006190 A1* | 1/2010 | Oka | C22C 38/02 148/592 |
| 2012/0227456 A1* | 9/2012 | Toniutti | B21D 9/073 72/129 |
| 2013/0086962 A1* | 4/2013 | Hayashi | B21D 11/06 72/146 |
| 2015/0286755 A1* | 10/2015 | Johansen | G06F 17/16 703/2 |
| 2016/0283613 A1* | 9/2016 | Ferri, II | G06F 30/18 |
| 2018/0200771 A1* | 7/2018 | Byard | B23K 37/0276 |
| 2018/0318899 A1* | 11/2018 | Byrd | B21D 7/12 |
| 2024/0045402 A1* | 2/2024 | Nickel | G05B 19/4099 |
| 2024/0419145 A1* | 12/2024 | Nickel | G05B 19/4097 |

FOREIGN PATENT DOCUMENTS

| | | | | |
|---|---|---|---|---|
| JP | 2002129288 | * | 5/2002 | C21D 8/10 |
| JP | 2004050363 | * | 7/2002 | B62H 7/04 |
| JP | 2010142817 | | 7/2010 | |
| KR | 19980031710 | | 7/1998 | |
| KR | 100210875 | | 7/1999 | |
| KR | 1019980008377 | * | 11/1999 | B21D 7/12 |
| KR | 100242819 | | 3/2000 | |
| KR | 1020100129617 | | 12/2010 | |
| KR | 101765847 | | 8/2017 | |
| KR | 1017658470000 | * | 8/2017 | B21D 7/12 |
| KR | 101788787 | | 11/2017 | |
| KR | 101837507 | | 3/2018 | |
| KR | 1018375070000 | * | 3/2018 | B21D 7/00 |
| WO | WO-2010142644 | * | 6/2010 | B21D 7/12 |

OTHER PUBLICATIONS

"Notification of Reason for Refusal of Korea Counterpart Application", issued on Aug. 18, 2020, with English translation thereof, p. 1-p. 15.

"Decision to Grant a Patent of Korean Counterpart Application," issued on Apr. 7, 2021, with English translation thereof, pp. 1-4.

* cited by examiner

APPARATUS, METHOD AND SYSTEM FOR AUTOMATICALLY FORMING PIPE

TECHNICAL FIELD

Embodiments of the present disclosure relate to an apparatus, method, and system for automatically forming a pipe. In particular, the present disclosure relates to an apparatus, method, and system capable of automatically extracting, from a design file including a pipe, information about a cutting point for dividing the pipe included in the design file into a plurality of pipes and information about a bending point of each of the plurality of pipes.

BACKGROUND ART

As a design scale of a building including a pipe, etc., becomes large, the demand for industrial pipes is increasing and the demand for pipe processing technology is also increasing. To secure a supply according to a demand for pipes, it is necessary to shorten a time required for a manufacturing process and automize the process.

However, in the case of an existing pipe forming apparatus, an operator has to directly input a value required for processing to the pipe forming apparatus by checking drawings, consuming a lot of working time. For example, in the case of an existing pipe processing technique, the operator has to do a division job to manually extract cutting points of hundreds to thousands of pipes included in a design drawing. Moreover, the operator directly inputs factors required for bending of a pipe, e.g., bending coordinates, to the pipe forming apparatus, resulting in a high possibility of an error in the input. When such an error occurs in the input, the production of a useless pipe occurs and an expense may be incurred due to destruction of the produced useless pipe.

Accordingly, there is a need for a pipe forming apparatus, method, and system for automating factor extraction for pipe processing, minimizing manpower, and minimizing an error.

DESCRIPTION OF EMBODIMENTS

Technical Problem

The present disclosure is made to solve the foregoing problem and provides an apparatus, method, and system for automatically forming a pipe. In particular, the present disclosure is provided to automatically extract, from a design file including a pipe, a factor for processing the pipe included in the design file into a plurality of pipes. However, the problem is merely an example, and the scope of the present disclosure is not limited by the same.

Solution to Problem

A method of automatically forming a pipe according to an embodiment of the present disclosure includes inputting a design file to a program for automatically extracting information for forming a pipe, automatically extracting, from the design file, information about a cutting point for dividing a pipe included in the design file into a plurality of two or more pipes and information about a bending point of each of the plurality of pipes, and transmitting, to a forming device for forming the pipe, pipe forming information including the cutting point and the bending point.

According to an embodiment, the automatically extracting of the information about the cutting point and the information about the bending point from the design file may include generating, from the design file, a three-dimensional (3D) model including a center line of the pipe included in the design file, determining a start point of formation and an end point of formation in the 3D model, and determining the cutting point for cutting the pipe at every designated length, along the center line in a section between the start point of formation and the end point of formation.

According to an embodiment, the determining of the cutting point for cutting the pipe at every designated length may include, when a point moved by the designated length from a cutting point is within a cutting-excluded distance from the bending point, determining, as the cutting point, a point deviating from the bending point by the cutting-excluded distance.

According to an embodiment, the automatically extracting of the information about the cutting point and the information about the bending point from the design file may include extracting relative coordinates of the bending point and relative coordinates of an end cutting point, with respect to a start cutting point, for each of the plurality of pipes divided by the cutting point and generating a list of the relative coordinates of the bending point and the relative coordinates of the end cutting point, with respect to the start cutting point, and the transmitting of the pipe forming information to the forming device may include transmitting the generated list to the forming device.

A system for automatically forming a pipe according to an embodiment of the present disclosure includes an electronic device configured to receive a design file to automatically extract information for forming the pipe and automatically extract, from the received design file, information about a cutting point for dividing a pipe included in the design file into a plurality of two or more pipes and information about a bending point of each of the plurality of pipes and a forming device configured to receive pipe forming information including the information about the cutting point and the information about the bending point from the electronic device and form the pipe based on the received pipe forming information.

Other aspects, features, and advantages other than those described above will become apparent from the following figures, claims, and the detailed description of the present disclosure.

Advantageous Effects of Disclosure

According to an embodiment of the present disclosure as described above, a pipe forming process may be automated, thereby innovatively reducing an error of input and improving productivity. In particular, a command or an instruction for pipe processing may be automatically generated, thereby reducing a pipe processing time and minimizing a cost.

However, the scope of the present disclosure is not limited by these effects.

MODE OF DISCLOSURE

Figure 1:
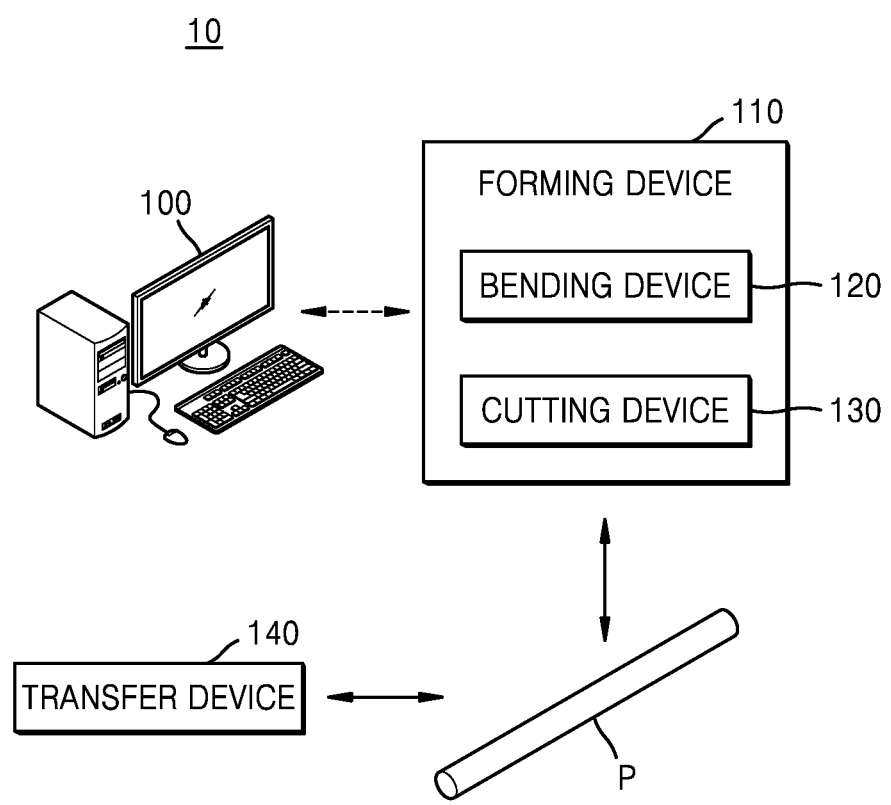
FIG. 1 shows a system for automatically forming a pipe, according to an embodiment of the present disclosure.

The present disclosure may have various modifications thereto and various embodiments, and thus particular embodiments will be illustrated in the drawings and described in detail in a detailed description. Effects and features of the present disclosure, and a method of achieving them will be apparent with reference to the embodiments described in detail in conjunction with the drawings. However, the present disclosure is not limited to the embodiments disclosed below, and may be implemented in various forms.

Hereinafter, embodiments of the present disclosure will be described in detail with reference to the accompanying drawings, and in description with reference to the drawings, the same or corresponding components are given the same reference numerals, and redundant description thereto will be omitted.

In the following embodiments, the terms such as first, second, etc., have been used to distinguish one component from other components, rather than for limiting.

In the following embodiment, singular forms include plural forms unless apparently indicated otherwise contextually.

In the following embodiments, the terms such as include, have, or the like are intended to mean that there are features or components, described herein, but do not preclude the possibility of adding one or more other features or components.

In the following embodiments, when a portion, such as a region, a component, a portion, a unit, a module, etc., is present on or above another portion, this case may include not only a case where it is directly on the other portion, but also a case where another region, component, portion, unit, module, etc., is arranged between the portion and the other portion.

In the drawings, the size of components may be exaggerated or reduced for convenience of description. For example, the size and thickness of each component shown in the drawings are shown for convenience of description, and thus the present disclosure is not necessarily limited to the illustration.

In the following embodiments, when a region, a component, a portion, a unit, a module, etc., are connected, this case may include not only a case where a region, a component, a portion, a unit, and a module are directly connected, but also a case where they are connected indirectly by another region, component, portion, unit, and module arranged therebetween.

Figure 2:
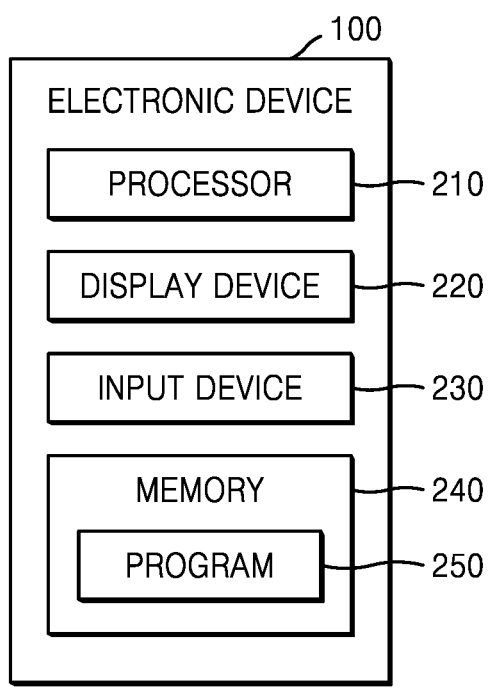
FIG. 2 shows an example of a functional configuration of an electronic device that extracts information for automatically forming a pipe, according to an embodiment of the present disclosure.

FIG. 1 shows a system 10 for automatically forming a pipe, according to an embodiment of the present disclosure. FIG. 2 shows an example of a functional configuration of an electronic device 100 that extracts information for automatically forming pipes (or pipe forming information), according to an embodiment of the present disclosure.

Referring to FIG. 1, the system 10 for automatically forming a pipe may include a pipe P, the electronic device 100 for extracting information for automatically forming the pipe P from a design file, a forming device 110 for forming the pipe P by applying a physical force to the pipe P, and a transfer device 140 for automatically transferring the pipe P. However, the present disclosure is not limited thereto. For example, at least some of components included in the system 10 may be omitted and other components may be further included.

The electronic device 100 may be a device for automatically extracting information for forming a pipe, included in the design file from the design file. The electronic device 100 may include, but not limited to, a computer device, a portable communication device, and the like.

Referring to FIG. 2, the electronic device 100 according to an embodiment of the present disclosure may include a processor 210, a display device 220, an input device 230, and memory 240. The memory 240 may store a program 250 for automatically extracting information for forming a pipe, from the design file.

The electronic device 100 may be a separate device (e.g., a computer device) distinct from the forming device 110. However, the present disclosure is not limited thereto. According to another embodiment of the present disclosure, the electronic device 100 may be included or embedded in the forming device 110 in the form of a processor (e.g., the processor 210) or memory (e.g., the memory 240) without being distinct from the forming device 110. In this case, the display device 220 may be omitted.

The processor 210 may perform various data processing or operation by executing, for example, software or the program 250. The data processing or operation may include data processing or operation for automatically extracting, from the design file, the information for forming a pipe included in the design file. The processor 210 may load a command or data received based on a user input, etc., into the memory 240 (e.g., volatile memory), process the stored command or data, and store result data in the memory 240 (e.g., non-volatile memory).

The memory 240 may store various data used by the electronic device 100 or the processor 210. The data may include input data or output data regarding, for example, software (e.g., the program 250) and a command related thereto. The memory 240 may include volatile memory or non-volatile memory. According to an embodiment of the present disclosure, the memory 240 may store the program 250 for automatically extracting, from the design file, the information for forming a pipe included in the design file.

The program 250 may be, for example, a design program (e.g., a computer aided design (CAD) program), but may be other programs distinct from the design program, without being limited thereto. The program 250 may store a plurality of instructions for automatically extracting the information for forming a pipe from the design file. The information for forming a pipe may include information about a cutting point and a bending point of pipes included in the design file.

The input device 230 may receive a command or data to be used in the electronic device 100 or the processor 210 from an outside (e.g., a user) of the electronic device 100. The input device 230 may include, for example, a mouse or a keyboard. According to an embodiment of the present disclosure, the input device 230 may be used for the user to input or load the design file to the program 250 to extract the information for forming a pipe.

The display device 220 may visually provide information to the outside (e.g., the user) of the electronic device 100. The display device 220 may include, for example, a display. According to an embodiment of the present disclosure, the display device 220 may display a screen or a user interface (UI) of the program 250 (e.g., the CAD program) for automatically extracting the information for forming a pipe from the design file. According to an embodiment, the display device 220 may display a UI showing information obtained as a result of extracting the information for forming pipes (e.g., the number of pipes, pipe standards, the number of pipes per standards, the number of pipes per sector, etc.) through the program 250.

Hereinbelow, detailed operations of the electronic device 100 or the processor 210 for automatically extracting the information for forming a pipe from the design file will be described.

The processor 210 may receive the design file through the program 250. The design file may include, for example, a CAD file. The design file may include a two-dimensional (2D), three-dimensional (3D), or five-dimensional (5D) modeling file. The design file may include, but not limited to, a DWG file, a DXF file, a STEP file, or an IGT file.

The design file may include a pipe wiring diagram. The pipe wiring diagram included in the design file may include a plurality of pipes, each extending from a start point to an end point thereof without information about a cutting point in the middle of the pipe. The design file may be input or loaded into the program 250 based on the user input to extract the information for forming a pipe from the pipe wiring diagram included in the design file.

According to an embodiment, when a 5D modeling file is input to the processor 210 through the program 250, the processor 210 may extract 3D information of the pipe (e.g., 3D coordinates of the pipe), included in the 5D modeling file.

According to an embodiment, the processor 210 may extract a center line of a pipe having 3D information from a design file (e.g., a 3D or 5D modeling file) input through the program 250. For example, the processor 210 may identify, from an input design file (e.g., the 3D or 5D modeling file), a pipe wiring diagram included in the design file, and generate a 3D model including center lines of pipes included in the pipe wiring diagram.

Figure 3:
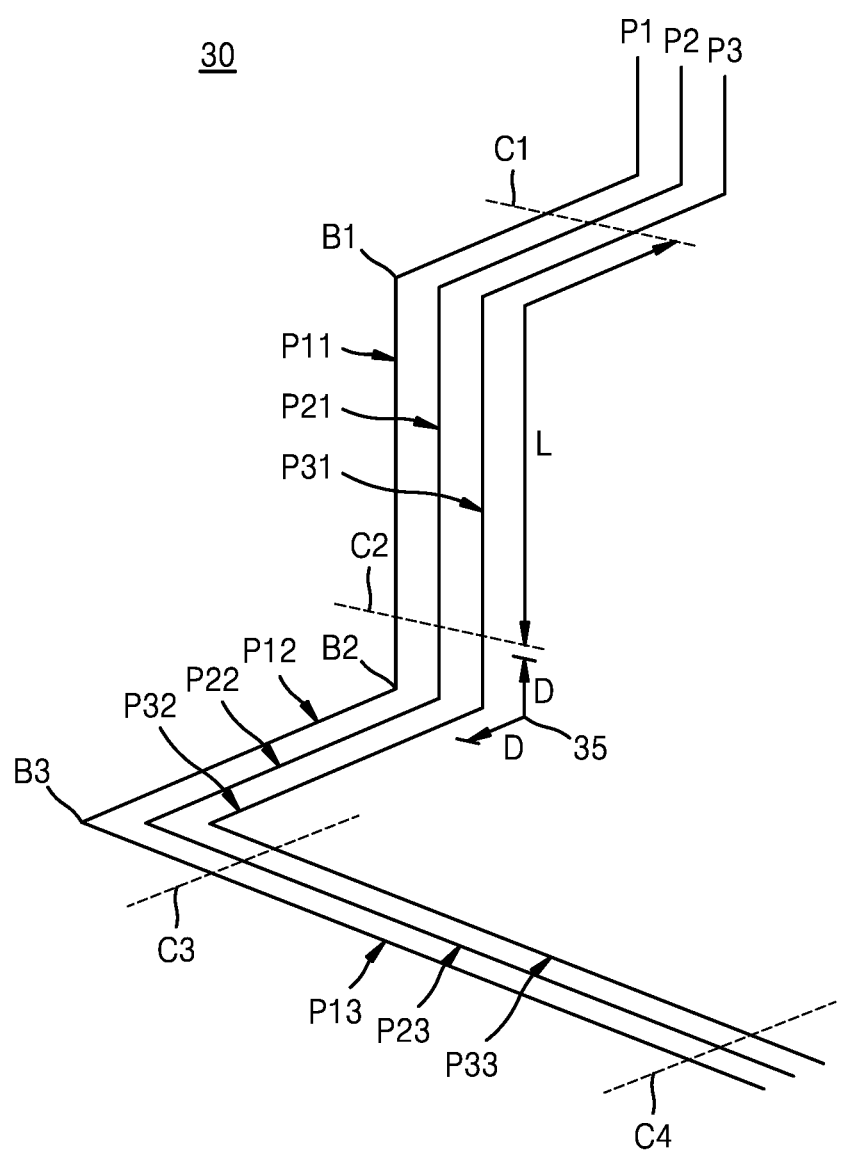
FIG. 3 shows a part of a three-dimensional (3D) model including center lines of pipes, according to an embodiment of the present disclosure.

FIG. 3 shows a part of a 3D model 30 including pipe center lines, according to an embodiment of the present disclosure. The 3D model 30 shown in FIG. 3 may be generated by the processor 210 from the design file input through the program 250, and FIG. 3 may be a conceptual diagram for description. The 3D model 30 shown in FIG. 3 may include, for example, three pipe center lines P1, P2, and P3.

Hereinbelow, a detailed method of automatically extracting information for forming a pipe will be described with reference to one pipe center line P1 for convenience.

The 3D model 30 generated from the input design file may include information about 3D coordinates (e.g., coordinates regarding a dot, a line segment, etc.) of the pipe center line P1. For example, the 3D model 30 may have information about standards of each pipe.

According to an embodiment, the processor 210 may automatically determine and extract information for forming pipes from the 3D model 30 including the pipe center lines generated as described above. The information for forming a pipe may include information about a cutting point and a bending point. The cutting point may refer to a point for dividing a pipe included in the design file into a plurality of pipes, and the bending point may refer to a point where each of the plurality of pipes is bent. The pipe forming information extracted by the processor 210 is not limited thereto, and the processor 210 may further calculate the number of pipes in total generated as a result of cutting, the number of pipes per standards, the number of pipes per sector, and the like.

The processor 210 may identify bending points B1, B2, and B3 at which the pipe center line P1 is bent, from the 3D model 30 including pipe center lines. For example, the processor 210 may identify or extract 3D coordinates of the bending points B1, B2, and B3. The 3D coordinates of the bending points B1, B2, and B3 may be represented by, for example, a (x, y, z)-orthogonal coordinate system. For example, when coordinates of a particular bending point are (100, 0, 0) and coordinates of the next bending point are (100, 50, 0) in the (x, y, z)-orthogonal coordinate system, it may mean that the pipe is bent at the particular bending point in a y direction and next bending occurs at a point moved by 50 from the particular bending point in the y direction. The unit may be an arbitrary unit, for example, mm, cm, etc.

The processor 210 may determine first to fourth cutting points C1, C2, C3, and C4 of the pipe included in the design file (i.e., included in the 3D model 30) through the program 250. For example, the processor 210 may determine the cutting points C1, C2, C3, and C4 for cutting the pipe included in the design file at every designated length L. The designated length L may be previously set and stored in the program 250. The designated length L may be, for example, several meters (e.g., 6 m), but not limited thereto, and may be designated or changed based on a user input.

For example, the processor 210 may calculate and store 3D coordinates of the cutting points C1, C2, C3, and C4 for cutting the pipe center line P1 at every designated length, based on the 3D coordinates (e.g., coordinates regarding a dot, a line segment, etc.) of the pipe center line P1.

The program 250 may store information about a cutting-excluded section 35 to be excluded from the cutting point. The cutting-excluded section 35 may be a section within a designated distance (or a cutting-excluded distance) from the bending points B1, B2, and B3 and/or a section within a designated distance from a connection point. The bending point is described above, and a description of the connection point may be as below.

For example, the design file and/or the 3D model 30 including pipe center lines, generated from the design file, may include information about a connection point (not shown) at which two or more different pipes are connected. The connection point may represent, for example, a point at which pipes of different standards are connected, a point where a path of a pipe is divided into two or more branches, etc., but the present disclosure is not limited thereto.

The processor 210 may identify the aforementioned connection point from the 3D model 30 including the pipe center lines. For example, the processor 210 may identify or extract 3D coordinates of the connection point. The 3D coordinates of the connection point may be represented by, for example, a (x, y, z)-orthogonal coordinate system.

According to an embodiment, the processor 210 may determine a cutting point to deviate from the cutting-excluded section 35 when determining the cutting points C1, C2, C3, and C4 for cutting the pipe center line P1 at every designated length in the 3D model 30. That is, the processor 210 may determine the cutting points C1, C2, C3, and C4, such that the cutting point is not within a cutting-excluded distance D from the bending points B1, B2, and B3, and/or from a cutting-excluded distance from the connection point. The cutting-excluded distance D may be, but not limited to, for example, several to several tens of centimeters (e.g., 10 cm).

More specifically, the processor 210 may calculate and store 3D coordinates of the cutting points C1, C2, C3, and C4 for cutting the pipe center line P1 at every designated length L (e.g., several meters). At this time, the processor 210 may determine whether a point moved by the designated length L along the pipe center line P1 from the first cutting point C1 determined at random is within the cutting-excluded section 35. The cutting-excluded section 35 may be a section within the cutting-excluded distance D (e.g., several to several tens of centimeters) from the bending points B1, B2, and B3, and/or the connection point.

More specifically, referring to FIG. 3, when the point moved by the designated length L from the first cutting point C1 is not within the cutting-excluded section 35, the processor 210 may determine the point moved by the designated length L from the first cutting point C1 as the second cutting point C2. When the point moved by the designated length L from the first cutting point C1 is within the cutting-excluded section 35, the processor 210 may determine a boundary point of the cutting-excluded section 35 as the second cutting point C2. For example, when the point moved by the designated length L from the first cutting point C1 is within the cutting-excluded distance D from a bending point (B2 of FIG. 3), a point before or after the cutting-excluded distance D from the bending point B2 may be determined as the second cutting point C2. In this case, for example, a point closer to the point moved by the designated length L from the first cutting point C1 between the point before the cutting-excluded distance D from the bending point B2 or the point after the cutting-excluded distance D from the bending point B2 may be determined as the second cutting point C2.

The processor 210 may calculate and store 3D coordinates of the second cutting point C2 determined as described above, in the 3D model 30 including the 3D coordinates of the pipe center lines P1, P2, and P3.

Meanwhile, the processor 210 may determine a start point of formation and an end point of formation in the 3D model 30 including the pipe center lines P1, P2, and P3. The reason for determining the start point of formation and the end point of formation is to automatically extract information for forming a pipe in bulk for sections in which changes are not to occur in the site.

For example, a part where a nozzle of a pipe starts or a part connected to a production facility may have many changes depending on the site. A change corresponding to a site situation may occur, such as a change in a position of a reinforcing bar or a position of the connection point. Therefore, according to an embodiment, the processor 210 may determine, as the start point of formation, a point moved by a designated length (e.g., L) along a pipe from a part of the pipe, connected to the production facility in the design file. In addition, the processor 210 may determine, as the end point of formation, a point before the designated length (e.g., L) along the pipe from a part of the pipe in which a nozzle starts.

According to an embodiment, the processor 210 may determine, as the start point of formation, a point moved by the designated length (e.g., L) from a start part of the pipe in the design file. The processor 210 may also determine, as the end point of formation, a point before the designated length (e.g., L) from an end part of the pipe in the design file. However, the present disclosure is not limited thereto.

The processor 210 may calculate and store 3D coordinates of the start point of formation and the end point of formation in the 3D model 30 including the 3D coordinates of the pipe center lines P1, P2, and P3. For example, the processor 210 may determine the second cutting point C2 in a manner described above, with the first cutting point C1 as the start point of formation. The processor 210 may determine next cutting points C2, C3, and C4 until the end point of formation is reached, with the first cutting point C1 as the start point of formation, in the manner described above. That is, the processor 210 may determine the plurality of cutting points C1, C2, C3, and C4 for cutting the pipe at every designated length L from the start point of formation to the end point of formation, such that the plurality of cutting points C1, C2, C3, and C4 are not in the cutting-excluded section 35. The processor 210 may extract the 3D coordinates of the determined plurality of cutting points C1, C2, C3, and C4.

According to an embodiment of the present disclosure described above, the processor 210 may automatically extract the plurality of cutting points in bulk in a section excluding a first part and a last part in the pipe wiring diagram included in the design file.

Due to the plurality of cutting points C1, C2, C3, and C4 determined as described above, the pipe center line P1 included in the 3D model 30 may be divided into first to third pipes P11, P12, and P13.

The processor 210 may identify the plurality of pipes P11, P12, and P13 generated due to the plurality of cutting points C1, C2, C3, and C4.

Meanwhile, each of the plurality of pipes P11, P12, and P13 divided due to the plurality of cutting points C1, C2, C3, and C4 may have or may not have a bending point.

According to an embodiment of the present disclosure, the processor 210 may extract relative coordinates of the bending points B1, B2, and B3 with respect to the cutting points C1, C2, and C3 for the plurality of pipes P11, P12, and P13, respectively, through the program 250.

More specifically, when the processor 210 generates the 3D model 30 from the design file, the processor 210 may identify 3D coordinates of the bending points B1, B2, and B3 for the coordinate system of the 3D model 30. That is, one origin (0, 0, 0) may exist in the 3D model 30, and the processor 210 may know 3D coordinates (x, y, z) of the bending points B1, B2, and B3 based on the origin.

According to an embodiment of the present disclosure, the processor 210 may perform coordinate transformation on the 3D coordinates of the bending points B1, B2, and B3 such that start cutting points (e.g., C1, C2, and C3) of pipes (e.g., P11, P12, and P13) including the respective bending points B1, B2, and B3 are the origin. That is, the processor 210 may indicate the coordinates of the bending points relatively with respect to a start cutting point of a pipe including the bending point. In other words, the processor 210 may transform the coordinates of the bending point such that the start cutting point is the origin (0, 0, 0), for each of the plurality of pipes.

Referring to FIG. 3, the processor 210 may transform, for the first pipe P11, coordinates of the bending point B1 included in the first pipe P11 and coordinates of the end cutting point C2 such that the start cutting point C1 is the origin. The processor 210 may also transform, for the second pipe P12, coordinates of the bending points B2 and B3 included in the second pipe P12 and coordinates of the end cutting point C3 such that the start cutting point C2 is the origin. The processor 210 may also transform, for the third pipe P13, the coordinates of the end cutting point C4 such that the start cutting point C3 is the origin.

For example, the coordinates of the start point of formation, the coordinates of the bending points, and the coordinates of the cutting points, extracted through the program 250 from the design file, may be represented as in Table 1. Table 1 shows an example irrelevant to FIG. 3.

TABLE 1

| No. | Processing Type | Coordinates |
| --- | --- | --- |
| 1 | Start Point | (0, 0, 0) |
| 2 | Bending | (100, 0, 0) |
| 3 | Bending | (100, 50, 0) |
| 4 | Cutting | (100, 50, 30) |
| 5 | Bending | (100, 50, 60) |
| 6 | Cutting | (100, 100, 60) |

Table 1 shows some of results of extracting, by the processor 210, information for forming a pipe from a pipe wiring diagram included in a design file input through the program 250.

Referring to Table 1, for convenience, a start point of formation is set to the origin (0, 0, 0), and four processes and six processes after the start point of formation are cutting processes. Thus, processes #1 to #4 indicate information for forming a first pipe, and processes #4 to #6 indicate information for forming a second pipe. The processor 210 may generate a data list as shown in Table 2 and Table 3 from Table 1 to generate information for forming each pipe (i.e., the first pipe or the second pipe).

TABLE 2

| No. | Coordinates |
| --- | --- |
| 1 | (0, 0, 0) |
| 2 | (100, 0, 0) |
| 3 | (100, 50, 0) |
| 4 | (100, 50, 30) |

Table 2 shows a result of extracting information for forming the first pipe from Table 1. Table 2 shows pipe forming information (i.e., coordinates of a bending point and a cutting point) corresponding to the processes #1 to #4 of Table 1, with respect to the start cutting point of the first pipe. That is, Table 2 shows the coordinates of the bending point in the first pipe and the coordinates of the end cutting point, with respect to the start cutting point of the first pipe.

TABLE 3

| No. | Coordinates |
| --- | --- |
| 1 | (0, 0, 0) |
| 2 | (0, 0, 30) |
| 3 | (0, 50, 30) |

Table 3 shows a result of extracting information for forming the second pipe from Table 1. Table 3 shows pipe forming information (i.e., coordinates of a bending point and a cutting point) corresponding to the processes #4 to #6 of Table 1, with respect to the start cutting point of the second pipe (i.e., the cutting point corresponding to the process #4 in Table 1). That is, the coordinates of the bending point in the second pipe and the coordinates of the end cutting point are transformed with respect to the start cutting point of the second pipe.

In various embodiments of the present disclosure as described above, the processor 210 may automatically determine a plurality of cutting points from an input design file, and automatically extract coordinates of the plurality of cutting points and coordinates of a plurality of bending points as pipe forming information. The processor 210 may automatically extract relative coordinates of a bending point and relative coordinates of an end cutting point, with a start cutting point as the origin, for each of a plurality of pipes generated due to a plurality of cutting points (e.g., Table 2 and Table 3). A data list extracted in this way may be transmitted as pipe forming information to the forming device 110. The data list may have a form as shown in Table 1 or Tables 2 and 3.

Meanwhile, pipes included in the design file may be grouped into a plurality of sectors (or zones). For example, the design file may include the plurality of pipe center lines P1, P2, and P3 arranged in parallel as may be seen in the 3D model 30, in which each of the plurality of pipe center lines P1, P2, and P3 may be divided into a plurality of pipes by the plurality of cutting points C1, C2, C3, and C4, and the plurality of pipes may be grouped by sector.

More specifically, for example, a sector (e.g., a first sector) defined as a zone between the cutting point C1 and the cutting point C2 may include a pipe P11 that is a part of the first pipe center line P1, a pipe P21 that is a part of the second pipe center line P2, and a pipe P31 that is a part of the third pipe center line P3. A sector (e.g., a second sector) defined as a zone between the cutting point C2 and the cutting point C3 may include a pipe P12 that is a part of the first pipe center line P1, a pipe P22 that is a part of the second pipe center line P2, and a pipe P32 that is a part of the third pipe center line P3. A sector (e.g., a third sector) defined as a zone between the cutting point C3 and the cutting point C4 may include a pipe P13 that is a part of the first pipe center line P1, a pipe P23 that is a part of the second pipe center line P2, and a pipe P33 that is a part of the third pipe center line P3.

The processor 210 may receive a design file through the program 250 to automatically determine the plurality of cutting points and identify or designate a sector of each of the plurality of pipes generated due to the plurality of cutting points. For example, the processor 210 may identify that the pipes P11, P21, and P31 are included in the same sector (e.g., the first sector) and store data for identifying the same.

For example, the processor 210 may identify each of the plurality of pipes generated due to the plurality of cutting points. The identification of each of the plurality of pipes by the processor 210 may include identifying a sector in which each of the plurality of pipes is included and/or identifying standard information of each of the plurality of pipes. The identification of each of the plurality of pipes by the processor 210 may include storing and identifying, for each of the plurality of pipes, coordinates of a bending point and coordinates of a cutting point, as forming information.

According to an embodiment, the processor 210 may display information extracted from the design file through the program 250 as described above on the display device 220 (e.g., a display). For example, the display device 220 may display the number of pipes in total generated due to the plurality of cutting points, the number of pipes per standards, the number of pipes per sector, etc.

Referring to FIG. 1, the electronic device 100 (or the processor 210) may transmit pipe forming information extracted as described above (e.g., the coordinates of the bending point and the coordinates of the cutting point) to the forming device 110. According to an embodiment, the electronic device 100 may transmit a data list including the coordinates of the bending point and the coordinates of the cutting point, in the form of a work order, to the forming device 110. The data list or the work order may have a form as shown in Table 1 or Tables 2 and 3.

The forming device 110 may receive the pipe forming information from the electronic device 100. According to an embodiment, the forming device 110 may receive, as the pipe forming information, a data list (e.g., a work order)

including 3D coordinates of the bending point and 3D coordinates of the cutting point. The forming device 110 may form the pipe P based on the received pipe forming information. The formation of the pipe P may include bending and cutting.

The forming device 110 may include a bending device 120 for bending the pipe P and a cutting device 130 for cutting the pipe P. According to an embodiment, the bending device 120 and the cutting device 130 may be separate devices distinct from each other. However, the present disclosure is not limited thereto, and according to another embodiment, the forming device 110 may be one device including the bending device 120 and the cutting device 130.

The bending device 120 may bend the pipe P according to the 3D coordinates of the bending point included in the received pipe forming information (e.g., the work order). For example, when the work order in the form of a data list is input, the bending device 120 may read the 3D coordinates of the bending point included in the work order and accordingly bend the pipe P.

The cutting device 130 may cut the pipe P according to the 3D coordinates of the cutting point included in the received pipe forming information (e.g., the work order). For example, when the work order in the form of a data list is input, the cutting device 130 may read the 3D coordinates of the cutting point included in the work order and accordingly cut the pipe P.

The transfer device 140 may automatically transfer the pipe P before and after formation of the pipe P. The transfer device 140 may include, for example, a robot arm. The transfer device 140 may transfer the pipe P before formation to the forming device 110 and insert the same into the forming device 110. The transfer device 140 may remove the formed pipe from the forming device 110 and transfer the formed pipe to another device.

Figure 4:
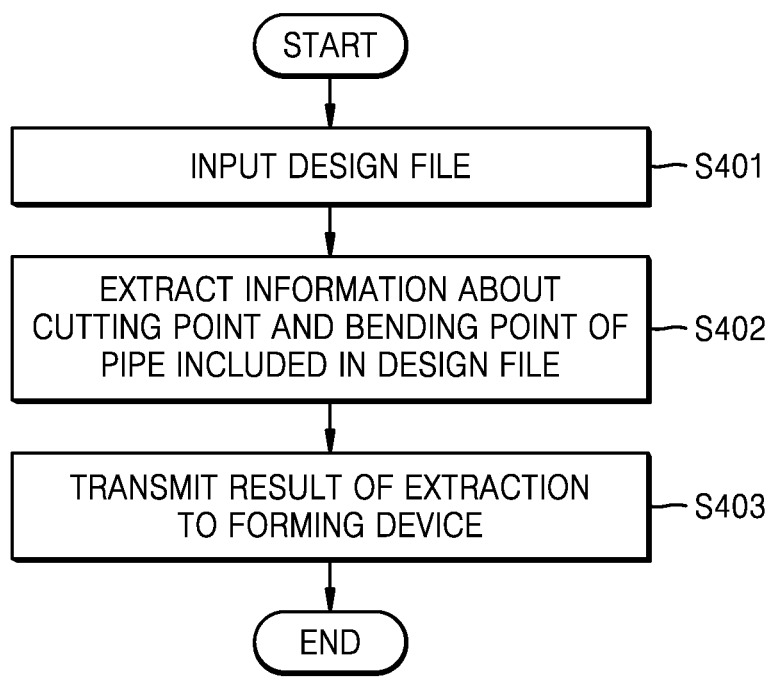
FIGS. 4 to 6 are flowcharts of a method of automatically forming a pipe, according to embodiments of the present disclosure.
Figure 5:
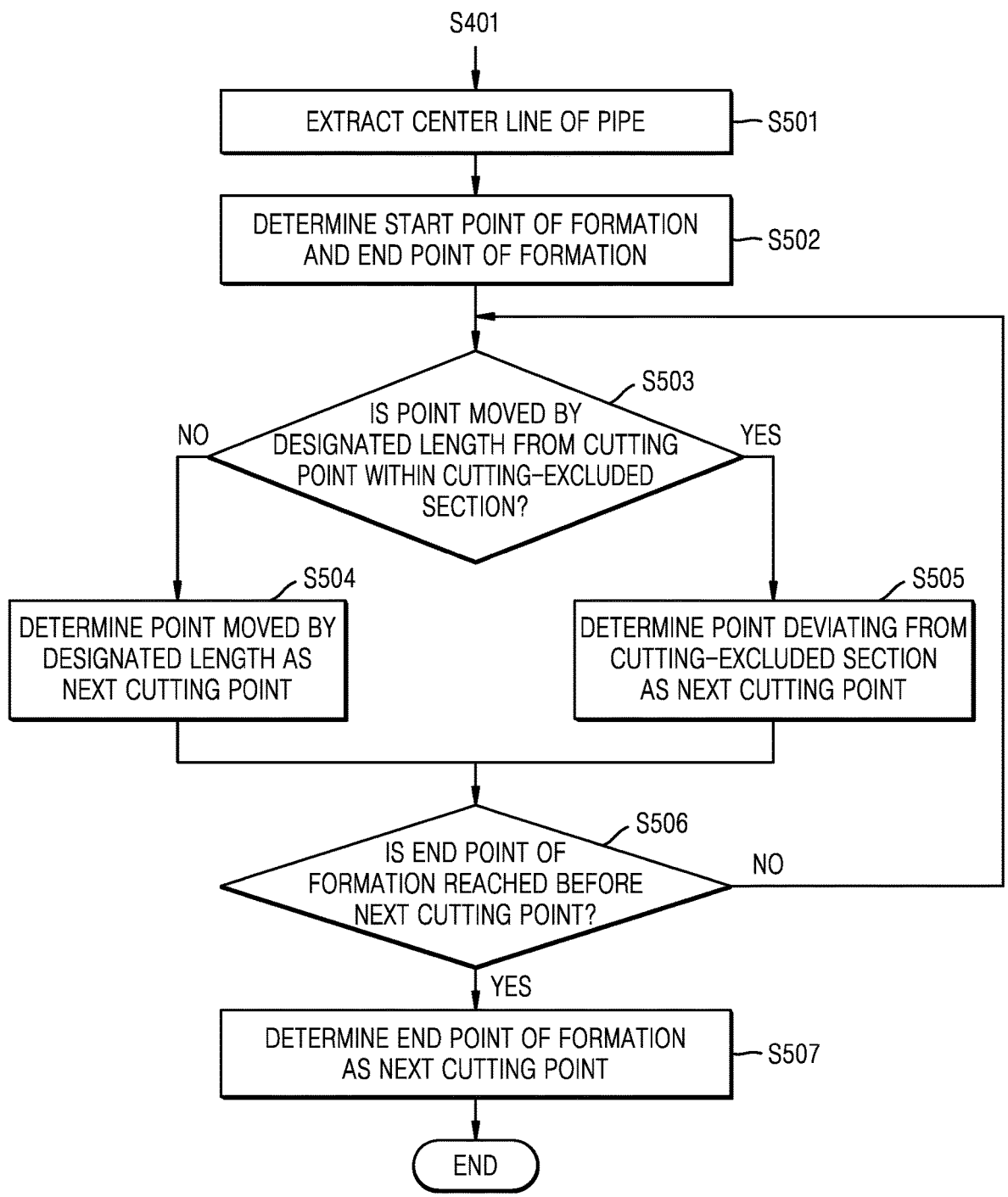
Figure 6:
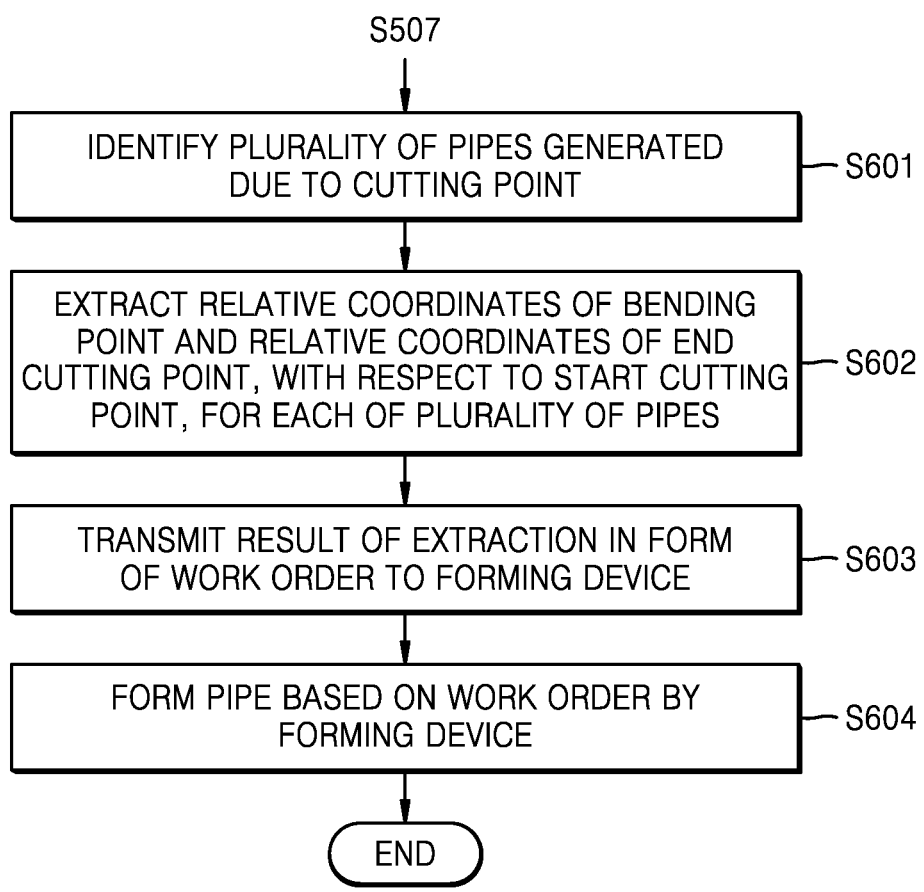

FIGS. 4 to 6 are flowcharts of a method of automatically forming a pipe, according to embodiments of the present disclosure.

Operations S401 to S403 may be performed by the processor 210 of the electronic device 100 through the program 250 for extracting pipe forming information.

In operation S401, the design file may be input to the program 250. The design file may include, for example, a CAD file. The design file may include a 2D, 3D, or 5D modeling file. The design file may include, but not limited to, a DWG file, a DXF file, a STEP file, or an IGT file. The design file may include a pipe wiring diagram.

In operation S402, the processor 210 may extract information about a cutting point and a bending point of the pipe, included in the design file, through the program 250. For example, the processor 210 may identify a pipe wiring diagram included in the design file and determine or extract one or more cutting points for dividing the pipe included in the pipe wiring diagram into a plurality of pipes. The processor 210 may also extract bending points at which the pipe is bent, from the pipe wiring diagram. For example, the processor 210 may extract, as the information about the cutting point and the information about the bending point, 3D coordinates of the cutting point and 3D coordinates of the bending point.

In operation S403, the processor 210 may transmit a result of the extraction to the forming device 110. For example, the processor 210 may automatically extract a data list or a work order including coordinates of the bending point and coordinates of the cutting point from the design file, and transmit the extracted data list or work order to the forming device 110.

FIG. 5 shows a method of determining, by the processor 210, a cutting point of a pipe included in a design file through the program 250, according to an embodiment of the present disclosure. Operations S501 to S507 may be included in a method of extracting information about a cutting point in operation S402. Operations S501 to S507 may be performed by the processor 210 through the program 250 for extracting pipe forming information.

After the design file is input in operation S401, the processor 210 may extract a pipe center line from the input design file in operation S501.

For example, the processor 210 may identify a pipe wiring diagram included in the design file from the input design file (e.g., the 3D or 5D modeling file), and generate a 3D model including center lines of pipes included in the pipe wiring diagram. The generated 3D model may include information about 3D coordinates of a pipe center line (e.g., coordinates of a dot or a line segment).

In operation S502, the processor 210 may determine a start point of formation and an end point of formation in the 3D model including the pipe center lines.

For example, to automatically extract pipe forming information in bulk for sections where a change does not occur in the site, the processor 210 may determine the start point of formation and the end point of formation in the pipe wiring diagram included in the design file and automatically extract the cutting point and the bending point in a section between the start point of formation and the end point of formation.

According to an embodiment, the processor 210 may determine, as the start point of formation, a point moved by a designated length along a pipe center line from a part of the pipe connected to a production facility. In addition, the processor 210 may determine, as the end point of formation, a point before the designated length along the pipe from a part of the pipe in which a nozzle starts.

According to an embodiment, the processor 210 may determine, as the start point of formation, a point moved by the designated length from a start part of the pipe in the pipe wiring diagram. The processor 210 may also determine, as the end point of formation, a point before the designated length from an end part of the pipe in the pipe wiring diagram.

Next, in operations S503 to S505, the processor 210 may determine the next cutting point, with the start point of formation as a start cutting point.

In operation S503, the processor 210 may determine whether a point moved by the designated length L from the cutting point is within a cutting-excluded section. The designated length may be, but not limited to, several meters.

For example, when the start point of formation is the start cutting point, it may be determined whether the point moved by the designated length from the start point of formation is within the cutting-excluded section. The cutting-excluded section may include a section within the cutting-excluded distance D from the bending point and a section within the cutting-excluded distance from the connection point. The cutting-excluded distance D may be less than the designated length L and may be several to several tens of centimeters. The designated length and the cutting-excluded distance may be previously stored and stored in the program 250, and may be designated or changed based on the user input.

When the point moved by the designated length L from the cutting point is not within the cutting-excluded section, the processor 210 may determine, as the next cutting point, the point moved by the designated length L, in operation S504.

When the point moved by the designated length L from the cutting point is within the cutting-excluded section, the processor 210 may determine, as the next cutting point, a point deviating from the cutting-excluded section, in operation S505. For example, a boundary point of the cutting-excluded section may be determined as the next cutting point. For example, when the point moved by the designated length L from the cutting point is within the cutting-excluded distance D from the bending point, the point before or after the cutting-excluded distance D from the bending point may be determined as the next cutting point.

In operation S506, the processor 210 may determine whether the end point of formation is reached before the next cutting point. The processor 210 may repeat operation S503 to S506 and determine one or more next cutting points, when the end point of formation is not reached.

When the end point of formation is reached before the next cutting point in operation S506, the processor 210 may determine the end point of formation as the next cutting point in operation S507 and terminate an algorithm for determining the cutting point.

Through operations S502 to S507, the processor 210 may automatically determine or extract one or more cutting points for dividing a pipe included in the pipe wiring diagram into a plurality of pipes. The processor 210 may extract and store 3D coordinates of the determined cutting points.

Referring to FIG. 6, after operation S507, in operation S601, the processor 210 may identify each of a plurality of pipes generated due to the cutting points.

In operation S602, the processor 210 may extract relative coordinates of a bending point and relative coordinates of an end cutting point with respect to a start cutting point, for each of the plurality of pipes. For example, the processor 210 may extract a list of relative coordinates of a bending point included in a first pipe among the plurality of pipes and relative coordinates of an end cutting point of the first pipe, with respect to a start cutting point of the first pipe. The processor 210 may also extract a list of relative coordinates of a bending point included in a second pipe among the plurality of pipes and relative coordinates of an end cutting point of the second pipe, with respect to a start cutting point of the second pipe.

For example, when the next pipe of the first pipe is the second pipe along a pipe center line, the end cutting point of the first pipe may be the start cutting point of the second pipe.

In operation S603, the processor 210 may transmit a result of the extraction in the form of a work order to the forming device 110. For example, the list of the relative coordinates of the bending point included in the first pipe and the relative coordinates of the end cutting point of the first pipe, with respect to the start point of the first pipe, may be transmitted as the work order of the first pipe to the forming device 110.

In operation S604, the forming device 110 may form a pipe based on the work order received in operation S603. The forming device 110 may form the first pipe according to the work order for the first pipe and form the second pipe according to a work order for the second pipe.

According to an embodiment, the forming device 110 may include the bending device 120 for bending the pipe and the cutting device 130 for cutting the pipe.

The bending device 120 may bend the pipe according to the 3D coordinates of the bending point included in the received work order (or the pipe forming information). The cutting device 130 may cut the pipe according to the 3D coordinates of the cutting point included in the received work order.

An apparatus and method for automatically forming a pipe according to various embodiments of the present disclosure described above may extract pipe forming information in bulk from a design file at a time and transmit the pipe forming information to a forming device, thereby automating production of a work order and minimizing an error rate.

Although the present disclosure has been described with reference to one embodiment shown in the drawings, it will be understood by those of ordinary skill in the art that these are merely examples and various modifications and changes of embodiments may be made therefrom. Accordingly, the true technical scope of the present disclosure should be defined by the technical spirit of the appended claims.

The invention claimed is:

1. A method of automatically forming a pipe, the method comprising:
    inputting a design file to a program for automatically extracting information for forming a pipe;
    automatically extracting, from the design file, information about a plurality of cutting points for dividing a pipe included in the design file into a plurality of pipes and information about a plurality of bending points of each of the plurality of pipes; and
    transmitting, to a forming device for forming the pipe, pipe forming information comprising the plurality of cutting points and the plurality of bending points,
    wherein the automatically extracting the information about the plurality of cutting points and the information about the plurality of bending points from the design file comprises:
    generating, from the design file, a three-dimensional (3D) model comprising a center line of the pipe included in the design file;
    determining a start point of formation and an end point of formation in the 3D model;
    automatically extracting the information about the plurality of bending points from the 3D model;
    determining a cutting-excluded section within a cutting-excluded distance from the plurality of bending points;
    determining a point moved by a designated length from a first cutting point among the plurality of cutting points;
    determining a second cutting point among the plurality of cutting points as the point excluded from the cutting-excluded section, or as one of the boundary points of the cutting-excluded section that includes the point,
    wherein the pipe is bent according to 3D coordinates of the plurality of bending points,
    wherein the pipe is further cut according to 3D coordinates of the plurality of cutting points.

2. The method of claim 1, further comprises:
    automatically extracting the information about a connection point at which two or more different pipes are connected from the 3D model.

3. The method of claim 2, further comprises:
    determining the cutting-excluded section within the cutting-excluded distance from the connection point.

4. The method of claim 1, wherein the automatically extracting the information about the plurality of cutting points and the information about the plurality of bending points from the design file comprises:
    extracting relative coordinates of the plurality of bending points and relative coordinates of an end cutting point, with respect to a start cutting point, for each of the plurality of pipes divided by the plurality of cutting points; and generating a list of the relative coordinates of the plurality of bending points and the relative coordinates of the end cutting point, with respect to the start cutting point, wherein the transmitting of the pipe forming information to the forming device comprises transmitting the generated list to the forming device.

5. An electronic device comprising:

a memory storing a program for automatically extracting information about a plurality of cutting points for dividing a pipe included in the design file into a plurality of pipes and information about a plurality of bending points of each of the plurality of pipes; and a processor operating the program, wherein the processor is configured to:

input a design file to the program;

generate from the design file, a three-dimensional (3D) model comprising a center line of the pipe included in the design file;

determine a start point of formation and an end point of formation in the 3D model;

automatically extract the information about the plurality of bending points from the 3D model;

determine a cutting-excluded section within a cutting-excluded distance from the plurality of bending points;

determine a point moved by a designated length from a first cutting point;

determine a second cutting point as the point excluded from the cutting-excluded section, or as one of the boundary points of the cutting-excluded section that includes the point; and transmit, to a forming device for forming the pipe, pipe forming information comprising a plurality of cutting points and the plurality of bending points, wherein the pipe is bent according to 3D coordinates of the plurality of bending points, wherein the pipe is further cut according to 3D coordinates of the plurality of cutting points.

* * * * *